(12) United States Patent
Cho et al.

(10) Patent No.: US 10,886,530 B2
(45) Date of Patent: Jan. 5, 2021

(54) SULFUR-CARBON COMPOSITE AND LITHIUM-SULFUR BATTERY COMPRISING SAME

(71) Applicant: LG CHEM, LTD., Seoul (KR)

(72) Inventors: Eunkyung Cho, Daejeon (KR); Doo Kyung Yang, Daejeon (KR); Dongwook Koh, Daejeon (KR)

(73) Assignee: LG CHEM, LTD., Seoul (KR)

( * ) Notice: Subject to any disclaimer, the term of this patent is extended or adjusted under 35 U.S.C. 154(b) by 126 days.

(21) Appl. No.: 16/099,337

(22) PCT Filed: Oct. 16, 2017

(86) PCT No.: PCT/KR2017/011377
§ 371 (c)(1),
(2) Date: Nov. 6, 2018

(87) PCT Pub. No.: WO2018/084449
PCT Pub. Date: May 11, 2018

(65) Prior Publication Data
US 2019/0245203 A1 Aug. 8, 2019

(30) Foreign Application Priority Data

Nov. 2, 2016 (KR) .................. 10-2016-0145193
Oct. 12, 2017 (KR) .................. 10-2017-0132039

(51) Int. Cl.
| | | |
|---|---|---|
| *H01M 4/38* | (2006.01) | |
| *C01B 17/00* | (2006.01) | |
| *H01M 4/60* | (2006.01) | |
| *H01M 4/62* | (2006.01) | |
| *H01M 4/58* | (2010.01) | |
| *H01M 10/052* | (2010.01) | |
| *H01M 4/13* | (2010.01) | |
| *C01B 32/00* | (2017.01) | |
| *H01M 4/587* | (2010.01) | |
| *H01M 10/0525* | (2010.01) | |
| *H01M 4/02* | (2006.01) | |

(52) U.S. Cl.
CPC .............. *H01M 4/38* (2013.01); *C01B 17/00* (2013.01); *C01B 32/00* (2017.08); *H01M 4/13* (2013.01); *H01M 4/58* (2013.01); *H01M 4/587* (2013.01); *H01M 4/5815* (2013.01); *H01M 4/602* (2013.01); *H01M 4/625* (2013.01); *H01M 10/052* (2013.01); *H01M 10/0525* (2013.01); *C01P 2006/16* (2013.01); *H01M 2004/027* (2013.01); *H01M 2004/028* (2013.01); *H01M 2300/0082* (2013.01); *Y02E 60/10* (2013.01); *Y02T 10/70* (2013.01)

(58) Field of Classification Search
None
See application file for complete search history.

(56) References Cited

U.S. PATENT DOCUMENTS

| | | |
|---|---|---|
| 6,302,928 B1 | 10/2001 | Xu et al. |
| 9,034,421 B2 | 5/2015 | Mikhaylik et al. |
| 2009/0311604 A1 | 12/2009 | Nazar et al. |
| 2012/0088154 A1 | 4/2012 | Liu et al. |
| 2013/0164625 A1 | 6/2013 | Manthiram et al. |
| 2013/0164635 A1 | 6/2013 | Schmidt et al. |
| 2016/0164103 A1 | 6/2016 | Son et al. |
| 2017/0104209 A1 | 4/2017 | Son et al. |

FOREIGN PATENT DOCUMENTS

| | | | |
|---|---|---|---|
| JP | 2012-528692 A | 9/2016 | |
| KR | 10-2003-0081778 A | 10/2003 | |
| KR | 10-2014-0084840 A | 7/2014 | |
| KR | 10-2014-0107582 A | 9/2014 | |
| KR | 10-1501267 B1 | 3/2015 | |
| KR | 10-2015-0061874 A | 6/2015 | |
| KR | 10-2015-0143223 A | 12/2015 | |
| KR | 10-2015-0143225 A | 12/2015 | |
| KR | 10-2016-0031293 A | 3/2016 | |
| KR | 10-2016-0037084 A | 4/2016 | |
| KR | 10-2016-0046775 A | 4/2016 | |
| WO | WO-2015160334 A1 * | 10/2015 | .............. H01M 4/38 |
| WO | WO 2015/190898 A1 | 12/2015 | |

OTHER PUBLICATIONS

Extended European Search Report for European Application No. 17868100.3, dated Apr. 16, 2019.
International Search Report (PCT/ISA/210) issued in PCT/KR2017/011377, dated May 28, 2018.
Li et al., "PEO-coated sulfur-carbon composite for high-performance lithium-sulfur batteries", J Solid State Electrochem, 2015, vol. 19, pp. 3373-3379.

* cited by examiner

*Primary Examiner* — Wojciech Haske
(74) *Attorney, Agent, or Firm* — Birch, Stewart, Kolasch & Birch, LLP

(57) ABSTRACT

A sulfur-carbon composite and a lithium-sulfur battery including the same, and in particular, to a sulfur-carbon composite comprising a porous carbon material; and sulfur on at least a part of an inside and outside surface of the porous carbon material, wherein the inside and outside surface of the porous carbon material include a coating layer comprising an ion conducting polymer, and a lithium-sulfur battery including the same. Also provided is an ion conducting polymer coating layer on a porous carbon material surface which thereby improves a lithium ion conducting property to a positive electrode, and as a result, may enhance capacity and life time properties of a lithium-sulfur battery.

8 Claims, 1 Drawing Sheet

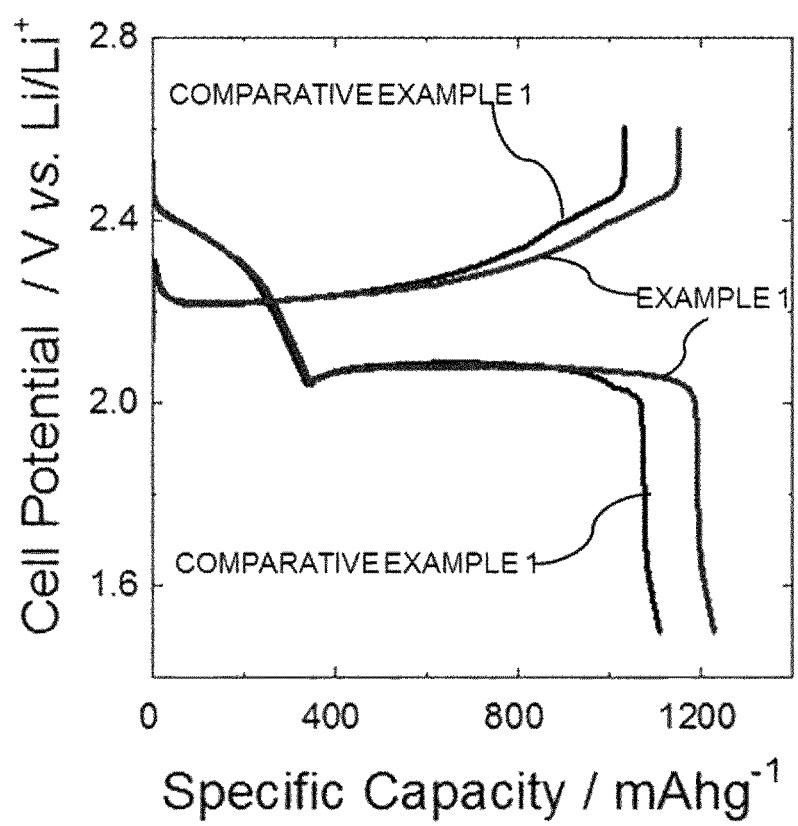

SULFUR-CARBON COMPOSITE AND LITHIUM-SULFUR BATTERY COMPRISING SAME

TECHNICAL FIELD

This application claims the benefits of Korean Patent Application No. 10-2016-0145193, filed on Nov. 2, 2016, with the Korean Intellectual Property Office and Korean Patent Application No. 10-2017-0132039, filed on Oct. 12, 2017, with the Korean Intellectual Property Office, the disclosure of which are herein incorporated by reference in their entirety.

The present invention relates to a sulfur-carbon composite having an improved ion conducting property, and a lithium-sulfur battery including the same.

BACKGROUND ART

With rapid growth of the electronic device field and the electric vehicle field, demands for secondary batteries have increased. Particularly, with the trend of smaller and lighter portable electronic devices, demands for secondary batteries having high energy density satisfying the trend have increased.

Among secondary batteries, a lithium-sulfur battery is a secondary battery using a sulfur-based compound having sulfur-sulfur bonds as a positive electrode active material, and using a carbon-based material having intercalation and deintercalation of an alkali metal such as lithium or metal ions such as lithium ions, or silicon, tin or the like forming an alloy with lithium as a negative electrode active material. Specifically, electrical energy is stored and produced using an oxidation-reduction reaction in which an oxidation number of sulfur decreases as sulfur-sulfur bonds are broken during discharge that is a reduction reaction, and sulfur-sulfur bonds are formed again as an oxidation number of sulfur increases during charge that is an oxidation reaction.

Particularly, sulfur used as a positive electrode active material in a lithium-sulfur battery has theoretical energy density of 1,675 mAh/g having theoretical energy density of approximately 5 times higher compared to existing positive electrode active materials used in lithium secondary batteries, and therefore, a lithium-sulfur battery is a battery capable of exhibiting high output and high energy density. In addition thereto, sulfur has advantages of being low-priced, being abundant in resources, being readily supplied and being environmental-friendly, and therefore, has received attention as an energy source of medium to large-sized devices such as electric vehicles as well as portable electronic devices.

However, sulfur has electrical conductivity of $5 \times 10^{-30}$ S/cm and is a nonconductor without electrical conductivity, and therefore, has a problem in that migration of electrons produced through an electrochemical reaction is difficult. Accordingly, sulfur is composited with an electrical conduction material such as carbon capable of providing the electrochemical reaction site and used as a sulfur-carbon composite.

Conventional sulfur-carbon composites have problems in that sulfur is leaked to an electrolyte during an oxidation-reduction reaction degrading a battery life time, and lithium polysulfide, a reduced material of sulfur, is eluted, and therefore, the composite no longer participates in the electrochemical reaction. In addition, there is also a problem of capacity decrease when sulfur in the electrode is loaded in excess. In view of the above, various technologies for improving mixed qualities of a conductive material and sulfur have been proposed.

As one example, Korean Patent Application Publication No. 2016-0037084 discloses that conductivity of a sulfur-carbon nanotube composite and amount of sulfur loading may increase by coating graphene on carbon nanotube aggregates including sulfur.

However, lithium ion conductivity is required together with electrical conductivity in order for sulfur to exhibit sufficient performance in a lithium-sulfur battery. Lithium ion conductivity is provided through a liquid electrolyte, and therefore, when a sulfur-carbon composite itself has lithium ion conductivity, lithium ion conductivity by the liquid electrolyte is more enhanced facilitating battery performance improvement.

Korean Patent Application Publication No. 2016-0046775 discloses that battery cycle properties may be enhanced through facilitating lithium ion migration as well as suppressing polysulfide elution by being provided with a positive electrode coating layer formed with amphiphile polymers on a part of the surface of a positive electrode active site including a sulfur-carbon composite.

The sulfur-carbon composites provided in these patents have somewhat improved electrical conductivity by modifying preparation methods or compositions, however, the effect is not sufficient in terms of lithium ion conductivity. Accordingly, studies on sulfur-carbon composites having excellent lithium ion conductivity have been increasingly required.

PRIOR ART DOCUMENTS

Patent Document

Korean Patent Application Publication No. 2016-0037084 (2016.04.05), Sulfur-carbon nanotube composite, method for preparing the same, cathode active material for lithium-sulfur battery including the same and lithium-sulfur battery including the same Korean Patent Application Publication No. 2016-0046775 (2016.04.29), Positive electrode for lithium-sulfur battery and method for preparing the same

DISCLOSURE

Technical Problem

As a result of extensive studies in view of the above, the inventors of the present invention have identified that, by introducing a coating layer including an ion conducting polymer on a surface of a porous carbon material, lithium ion conductivity improves through facilitating transfer of lithium ion to the inside of a composite.

Accordingly, an aspect of the present invention provides a sulfur-carbon composite having an enhanced lithium ion migration property by forming a coating layer including an ion conducting polymer between a porous carbon material and sulfur.

Another aspect of the present invention provides a positive electrode including the sulfur-carbon composite, and a lithium-sulfur battery including the same.

Technical Solution

According to an aspect of the present invention, there is provided a sulfur-carbon composite comprising a porous carbon material; and sulfur on at least a part of an inside and outside surface of the porous carbon material, wherein the inside and outside surface of the porous carbon material include a coating layer including an ion conducting polymer.

The ion conducting polymer comprises at least one selected from the group consisting of poly(ethylene oxide), poly(propylene oxide), poly(vinylidene fluoride), poly(vinylidene fluoride-co-hexafluoropropylene), poly(olefin), polyphosphazene, poly(acrylonitrile), poly(methylmethacrylate), poly(vinyl chloride) and polysiloxane.

The ion conducting polymer is included in an amount of from 0.1 parts by weight to 50 parts by weight, based on 100 parts by weight of the porous carbon material.

According to an aspect of the present invention, there is also provided a sulfur-carbon composite comprising a carbon material of which surface is coated with an ion conducting polymer, and sulfur.

The carbon material comprises at least one selected from the group consisting of natural graphite, artificial graphite and expanded graphite.

The sulfur-carbon composite further includes a conductive material.

According to another aspect of the present invention, there is provided a positive electrode for a lithium-sulfur battery including the sulfur-carbon composite.

According to another aspect of the present invention, there is also provided a lithium-sulfur battery including the positive electrode.

Advantageous Effects

A sulfur-carbon composite according to the present invention is provided with a coating layer including an ion conducting polymer on a porous carbon material surface, and is capable of effectively transferring lithium ions to the inside of the composite thereby improving ion conductivity and reactivity with a positive electrode active material, and as a result, capacity and life time properties of a lithium-sulfur battery can be enhanced.

DESCRIPTION OF DRAWINGS

FIG. 1 is a graph showing charge and discharge properties of lithium-sulfur battery coin cells manufactured using Example 1 and Comparative Example 1 of the present invention.

BEST MODE

Hereinafter, the present invention will be described in more detail.

Terms or words used in the present specification and the claims are not to be interpreted limitedly to common or dictionary meanings, and shall be interpreted as meanings and concepts corresponding to technological ideas of the present disclosure based on a principle in which the inventors may suitably define the concepts of terms in order to describe the invention in the best possible way.

The term 'composite' used in the present specification means a material combining two or more materials, and exhibiting more effective functions while forming physically and chemically different phases.

A lithium-sulfur battery uses sulfur as a positive electrode active material, and lithium metal as a negative electrode active material. When discharging the lithium-sulfur battery, an oxidation reaction of lithium occurs in a negative electrode, and a reduction reaction of sulfur occurs in a positive electrode. Herein, the reduced sulfur forms bonds with lithium ions migrated from the negative electrode to be converted to lithium polysulfide, and accompanies a reaction finally forming lithium sulfide.

A lithium-sulfur battery has significantly higher theoretical energy density compared to existing lithium secondary batteries, and sulfur used as a positive electrode active material has received attention as a next-generation battery with an advantage of being abundant in resources and thereby low-priced, and lowering battery manufacturing costs.

Despite such an advantage, there are difficulties in obtaining full theoretical energy density in actual operation due to low electrical conductivity and lithium ion conducting property of sulfur, a positive electrode active material.

In order to improve electrical conductivity of sulfur, methods of forming a composite or coating with conductive materials such as carbon or polymer have been used. Among various methods, a sulfur-carbon composite has been used most widely as a positive electrode active material since it is effective in improving electrical conductivity of a positive electrode, however, the sulfur-carbon composite is not sufficient in terms of charge and discharge capacity and efficiency. The capacity and efficiency of a lithium-sulfur battery may vary depending on the amount of lithium ions transferred to a positive electrode. Accordingly, readily transferring lithium ions into a sulfur-carbon composite is important for batteries to have high capacity and high efficiency.

In view of the above, the present invention provides a sulfur-carbon composite including a carbon material having a coating layer formed with an ion conducting polymer in order to secure reactivity between the sulfur-carbon composite and a liquid electrolyte and effects of improving lithium-sulfur battery capacity and efficiency properties by providing lithium ion conductivity into the sulfur-carbon composite.

The sulfur-carbon composite according to one embodiment of the present invention comprises a porous carbon material; and sulfur on at least a part of an inside and outside surface of the porous carbon material, wherein the inside and outside surface of the porous carbon material include a coating layer comprising an ion conducting polymer.

According to one embodiment of the present invention, the porous carbon material includes a coating layer comprising an ion conducting polymer on the inside and outside surface. The ion conducting polymer may enhance both capacity and life time properties of a lithium-sulfur battery by securing a migration path of lithium ions into the sulfur-carbon composite, that is, into the pores of the porous carbon material and thereby increasing reactivity with sulfur, a positive electrode active material, together with high ion conductivity.

The ion conducting polymer may comprise at least one selected from the group consisting of poly(ethylene oxide) (PEO), poly(propylene oxide) (PPO), poly(vinylidene fluoride) (PVDF), poly(vinylidene fluoride-co-hexafluoropropylene) (PVdF-HFP), poly(olefin) (PO), polyphosphazene, poly(acrylonitrile) (PAN), poly(methylmethacrylate) (PMMA), poly(vinyl chloride) (PVC) and polysiloxane. The ion conducting polymer may preferably include at least one selected from the group consisting of poly(ethylene oxide), poly(propylene oxide), poly(vinylidene fluoride) and poly(vinylidene fluoride-co-hexafluoropropylene).

A weight average molecular weight of the ion conducting polymer is not particularly limited, and those that may be commonly used in the art may be used without limit. As one example, the ion conducting polymer may have a weight average molecular weight of from 20,000 g/mol to 50,000,000 g/mol.

The ion conducting polymer may be used in an amount of from 0.1 parts by weight to 50 parts by weight and preferably from 1 parts by weight to 25 parts by weight, based on 100 parts by weight of the porous carbon material. When the ion conducting polymer is used in less than the above-mentioned range, the coating layer is insufficiently formed on the porous carbon material making a target effect of improving ion conductivity may not be obtained, and the ion conducting polymer being used in greater than the above-mentioned range may have an adverse effect on a slurry preparation process, function as a positive electrode active material, and battery performance.

The porous carbon material provides a skeleton capable of uniformly and stably fixing sulfur, a positive electrode active material, and supplements electrical conductivity of sulfur to smoothly progress an electrochemical reaction.

The porous carbon material may be generally prepared by carbonizing a precursor of various carbon materials. The porous carbon material includes irregular pores therein, and the pores have an average diameter in a range of from 1 nm to 200 nm, and pore density or porosity may be in a range of from 10% to 90% of the total porous volume. When the pores have an average diameter of less than the above-mentioned range, the pore size is merely a molecular level making sulfur impregnation impossible, and when the pores have an average diameter of greater than the above-mentioned range, mechanical strength of the porous carbon is weakened, which is not preferred to be used in an electrode preparation process.

The form of the porous carbon material may be a globular type, a rod type, a needle type, a plate type, a tube type or a bulk type, and may be used without limit as long as it is commonly used in a lithium-sulfur battery.

The porous carbon material may be used without limit as long as it is a material having a porous structure or a high specific surface area and commonly used in the art. Examples of the porous carbon material may be at least one selected from the group consisting of graphite; graphene: carbon black such as denka black, acetylene black, ketjen black, channel black, furnace black, lamp black or thermal black; carbon nanotubes (CNT) such as single-walled carbon nanotubes (SWCNT) or multi-walled carbon nanotubes (MWCNT): carbon fibers such as graphite nanofibers (GNF), carbon nanofibers (CNF) or activated carbon fibers (ACF); and active carbon, but are not limited thereto.

The sulfur may comprise at least one selected from the group consisting of inorganic sulfur ($S_8$), $Li_2S_n$ ($n \geq 1$), organic sulfur compounds and carbon-sulfur polymers [$(C_2S_x)_n$, x=2.5 to 50, n≥2]. Preferably, inorganic sulfur ($S_8$) may be used.

In the sulfur-carbon composite according to the present invention, a weight ratio of the porous carbon material including the described above coating layer and sulfur may be from 1:9 to 5:5 and preferably from 2:8 to 3:7. When the weight ratio is less than above-mentioned range, an added amount of a binder required to prepare positive electrode slurry increases as the porous carbon material content increases. Such an increase in the added amount of a binder resultantly increases sheet resistance of an electrode performing a role of an insulator preventing electron migration (electron pass), and cell performance may decline therefrom. On the contrary, when the weight ratio is greater than the above-mentioned range, sulfurs aggregate by themselves, and direct participation in an electrode reaction may become difficult since the sulfur is difficult to receive electrons.

In addition, in the present invention, the sulfur-carbon composite may include sulfur:porous carbon material:ion conducting polymer in a weight ratio of from 50 to 90:from 6 to 45:from 0.01 to 15. When the composition ratio in the sulfur-carbon composite corresponds to the above-mentioned range, the lithium ion migration property and the effect of reactivity improvement described above may be secured.

In addition, in the sulfur-carbon composite according to one embodiment of the present invention, the sulfur is located on the surface as well as inside the pores of the porous carbon material, and herein, may be present in a region of less than 100%, preferably from 1% to 95% and more preferably from 60% to 90% of the whole outside surface of the porous carbon material. When the sulfur is present in the above-mentioned range on the surface of the porous carbon material, maximum effects may be obtained in terms of electron transfer area and liquid electrolyte wettability. Specifically, the sulfur is thinly and evenly impregnated on the porous carbon material surface in the region of above-mentioned range, and therefore, an electron transfer contact area may increase in a charge and discharge process. When the sulfur is located in a 100% region of the porous carbon material surface, the porous carbon material is completely covered with sulfur reducing electrolyte wettability, and reducing contact with a conductive material included in an electrode, and as a result, electrons are not transferred and participation in the reaction becomes impossible.

In addition, a sulfur-carbon composite according to another embodiment of the present invention comprises a carbon material of which surface is coated with an ion conducting polymer, and sulfur.

According to another embodiment of the present invention, in a sulfur-carbon composite simply mixing a carbon material and sulfur, a coating layer including an ion conducting polymer is introduced to an inside and outside surface of the carbon material to facilitate smooth lithium ion transfer into the composite, and as a result, battery performance and life time are more enhanced.

The ion conducting polymer and the sulfur are the same as described in one embodiment of the present invention.

The carbon material performs a role of providing electrical conductivity to sulfur and facilitating uniform distribution. The carbon material may comprise at least one selected from the group consisting of natural graphite, artificial graphite and expanded graphite. The carbon material is preferably expanded graphite.

The expanded graphite is prepared from a graphitic or partially graphitic starting material selected from the group consisting of ordinary natural graphite, pyrolytic graphite, kish graphite, compressed expanded graphite, partially oxidized graphite and graphite fibers. The starting material reacts with an insertion material to provide an intercalation compound and then expanded. The insertion material may include halogen, $SO_3$, $NO_3$, alkali metals or other compounds. Preferably, the intercalation compound is obtained by treating the starting material, preferably, graphite, with strong acid such as concentrated sulfuric acid or concentrated nitric acid together with an oxidizer. Herein, an organic acid such as formic acid or acetic acid may be used instead of the strong acid. An insertion compound prepared through the reaction with the insertion material, that is, inserted graphite, is washed and/or dried. The insertion compound may be directly prepared, or commercially available products may be purchased to be used. For example, the insertion compound may be obtained from NGS Naturgraphit GmbH (Germany), LUH GmbH (Germany) and TECHNOGRAFIT GmbH (Germany).

When the insertion compound is rapidly heated to 200° C. to approximately 1000° C., a reaction occurs due to pyrolysis of the insertion material such as an N- or S-compound, and a crystal layer of the graphite is peeled off emitting gas decomposition products. The heat treatment may be carried out through, for example, an expansion oven, a plasma oven or microwaves. A volume of the expanded graphite may reach a maximum of 280 times of the starting material volume. Herein, the changes in the volume may vary depending on the particle size of the graphite used, the type of the starting material (for example, natural graphite or artificial graphite), the heating type, rate and the like.

Preparation of the expanded graphite is known to those skilled in the art, and for example, may use the preparation method disclosed in European Patent No. 1,491,497.

The sulfur-carbon composite may further include a conductive material.

The conductive material is not particularly limited as long as it has conductivity without inducing chemical changes to a battery. As examples of the conductive material, carbon black such as Super-P, denka black, acetylene black, ketjen black, channel black, furnace black, lamp black or thermal black; carbon derivatives such as carbon nanotubes or fullerene; conductive fibers such as carbon fibers or metal fibers; fluorocarbon, aluminum and metal powders such as nickel powder; or conductive polymers such as polyaniline, polythiophene, polyacetylene or polypyrrole may be used either alone or as a mixture.

In addition, the present invention provides a method for preparing the sulfur-carbon composite.

The method for preparing the sulfur-carbon composite according to the present invention is not particularly limited, and methods commonly known in the art may be used.

The method for preparing the sulfur-carbon composite according to one embodiment of the present invention may include forming a coating layer comprising an ion conducting polymer on an inside and outside surface of a porous carbon material; mixing the coating layer-formed porous conductor, sulfur and an organic solvent; and forming a sulfur-carbon composite by heating the mixture to melt the sulfur, and loading the melted sulfur on at least a part of the inside and outside surface of the porous carbon material.

A method for preparing the sulfur-carbon composite according to another embodiment of the present invention may include forming a coating layer comprising an ion conducting polymer on a carbon material surface, and forming a sulfur-carbon composite by mixing the coating layer-formed carbon material and sulfur.

The forming of a coating layer on a porous conductor or a carbon material using an ion conducting polymer may be carried out through processes of introducing a porous conductor or a carbon material to an ion conducting polymer-dissolved solution, stirring the result, and then filtering and drying the result, however, any method may be used as long as it is known in the art.

The mixing is for enhancing the degree of mixing between the materials described above, and may be carried out using a stirring device commonly used in the art. Herein, the mixing time and rate may also be selectively controlled depending on the raw material content and the condition.

The heating temperature may be any temperature as long as it is a temperature melting sulfur, and specifically, may be from 120° C. to 180° C. and preferably from 150° C. to 180° C. When the heating temperature is lower than 120° C., sulfur is not sufficiently melted, and the sulfur-carbon composite structure may not be properly formed, and when the temperature is greater than 180° C., the coated polymer may not remain making it difficult to obtain target effects. In addition thereto, the heating time may be controlled depending on the sulfur content.

Through the preparation method described above, a sulfur-carbon composite having a coating layer comprising an ion conducting polymer formed between a porous carbon material or a carbon material and sulfur may be prepared, and in the sulfur-carbon composite, lithium ions may readily migrate into the composite by coating the surface of the porous carbon material or the carbon material with the ion conducting polymer. Accordingly, reactivity with a liquid electrolyte increases when introduced to a battery as a positive electrode active material exhibiting effects of improving battery capacity and life time.

In addition, the present invention provides a positive electrode for a lithium-sulfur battery including the sulfur-carbon composite. The sulfur-carbon composite may be included in the positive electrode as a positive electrode active material.

The positive electrode may further include one or more additives selected from among transition metal elements, group IIIA elements, group IVA elements, sulfur compounds of these elements, and alloys of these elements and sulfur, in addition to the positive electrode active material.

As the transition metal element, Sc, Ti, V, Cr, Mn, Fe, Co, Ni, Cu, Zn, Y, Zr, Nb, Mo, Tc, Ru, Rh, Pd, Os, Ir, Pt, Au, Hg or the like may be included. As the group IIIA element, Al, Ga, In, Ti or the like may be included, and as the group IVA element, Ge, Sn, Pb or the like may be included.

The positive electrode may further include, together with the positive electrode active material, or selectively with the additives, an electrically conductive material for smoothly migrating electrons in the positive electrode, and a binder for favorably attaching the positive electrode active material on a current collector.

The conductive material is not particularly limited as long as it has conductivity without inducing chemical changes to a battery, and as the conductive material, carbon black such as Super-P, denka black, acetylene black, ketjen black, channel black, furnace black, lamp black, thermal black or carbon black; carbon derivatives such as carbon nanotubes or fullerene; conductive fibers such as carbon fibers or metal fibers; fluorocarbon, aluminum and metal powders such as nickel powder; or conductive polymers such as polyaniline, polythiophene, polyacetylene or polypyrrole may be used either alone or as a mixture.

The conductive material may be added in 0.01% by weight to 30% by weight, based on the total weight of the mixture including the positive electrode active material.

The binder has functions of keeping the positive electrode active material on the positive electrode current collector, and organically linking the positive electrode active materials, and examples thereof may include polyvinylidene fluoride, polyvinyl alcohol, carboxymethylcellulose, starch, hydroxypropylcellulose, regenerated cellulose, polyvinyl pyrrolidone, tetrafluoroethylene, polyethylene, polypropylene, ethylene-propylene-diene rubber (EPDM), sulfonated-EPDM, styrene-butadiene rubber, fluoro rubber, various copolymers thereof, and the like.

The binder may be included in 0.5% by weight to 30% by weight, based on the total weight of the mixture including the positive electrode active material. When the binder content is less than 0.5% by weight, physical properties of the positive electrode decline eliminating the active material and the conductor in the positive electrode, and when the content is greater than 30% by weight, a ratio of the active material and the conductor relatively decreases in the positive electrode reducing battery capacity.

When specifically examining a method for preparing the positive electrode of the present invention, the binder is dissolved in a solvent for preparing slurry first, and then the conductive material is dispersed thereinto. As the solvent for preparing the slurry, those capable of uniformly dispersing the positive electrode active material, the binder and the conductive material and readily evaporating are preferably used, and typical examples thereof may include acetonitrile, methanol, ethanol, tetrahydrofuran, water, isopropyl alcohol and the like. Next, the positive electrode active material, or selectively together with the additives, is uniformly dispersed again in the solvent into which the conductor is dispersed to prepare positive electrode slurry. The amounts of the solvent, the positive electrode active material, or selectively the additives included in the slurry do not carry an important meaning in the present application, and it is sufficient that the slurry has proper viscosity to be readily coated.

The slurry prepared as above is coated on the current collector, and the result is vacuum dried to form a positive electrode. The slurry may be coated on the current collector to a proper thickness depending on the slurry viscosity and the thickness of the positive electrode to form.

The current collector is not particularly limited as long as it may be prepared to generally have a thickness of from 3 μm to 500 μm, and has high conductivity without inducing chemical changes to a battery. Specifically, conductive materials such as stainless steel, aluminum, copper or titanium may be used, and more specifically, a carbon-coated aluminum current collector may be used. Using a carbon-coated aluminum substrate has advantages compared to using aluminum substrates without carbon coating in that adhesive strength for an active material is superior, contact resistance is low, and corrosion of aluminum caused by polysulfide is prevented. In addition, the current collector may have various forms such as films, sheets, foil, nets, porous bodies, foams or non-woven fabrics.

In addition, the present invention provides a lithium-sulfur battery including a positive electrode including the sulfur-carbon composite described above; a negative electrode; and an electrolyte interposed between the positive electrode and the negative electrode.

The positive electrode is the positive electrode according to the present invention and is the same as described above.

The negative electrode may be formed with a current collector, and a negative electrode active material layer formed on one surface or both surfaces of the current collector. As the negative electrode active material, a material capable of reversibly intercalating or deintercalating lithium ions, a material capable of reversibly forming a lithium-containing compound by reacting with lithium ions, lithium metal or a lithium alloy may be used.

Examples of the material capable of reversibly intercalating or deintercalating lithium ions may include crystalline carbon, amorphous carbon or a mixture thereof.

Examples of the material capable of reversibly forming a lithium-containing compound by reacting with lithium ions may include tin oxide, titanium nitrate or silicon.

Examples of the lithium alloy may include alloys of lithium and metals selected from the group consisting of Na, K, Rb, Cs, Fr, Be, Mg, Ca, Sr, Ba, Ra, Al and Sn.

Between the positive electrode and the negative electrode described above, a separator may be additionally included. The separator separates or insulates the positive electrode and the negative electrode from each other, and enables lithium ion transfer between the positive electrode and the negative electrode, and may be formed with porous non-conductive or insulating materials. Such a separator may be an independent member such as a film, or a coating layer added to the positive electrode and/or the negative electrode.

Examples of the material forming the separator may include polyolefin such as polyethylene and polypropylene, glass fiber filter papers and ceramic materials, but are not limited thereto, and the thickness may be from approximately 5 μm to approximately 50 μm and preferably from approximately 5 μm to approximately 25 μm.

The electrolyte is located between the positive electrode and the negative electrode, and includes a lithium salt and an electrolyte solvent.

The concentration of the lithium salt may be from 0.2 M to 2 M, specifically from 0.6 to 2 M and more specifically from 0.7 to 1.7 M depending on various factors such as an accurate composition of the electrolyte solvent mixture, solubility of the salt, conductivity of the dissolved salt, charge and discharge conditions of a battery, a working temperature, and other factors known in the lithium battery field. When the lithium salt concentration is used in less than 0.2 M, conductivity of the electrolyte may decrease causing decline in the electrolyte performance, and when the lithium salt concentration is used in greater than 2 M, viscosity of the electrolyte increases leading to a decrease in the lithium ion mobility.

The lithium salt may be used without limit as long as it is commonly used in liquid electrolytes for a lithium-sulfur battery. Examples thereof may include at least one selected from the group consisting of LiSCN, LiBr, LiI, $LiPF_6$, $LiBF_4$, $LiB_{10}Cl_{10}$, $LiSO_3CF_3$, LiCl, $LiClO_4$, $LiSO_3CH_3$, $LiB(Ph)_4$, $LiC(SO_2CF_3)_3$, $LiN(SO_2CF_3)_2$, $LiCF_3CO_2$, $LiAsF_6$, $LiSbF_6$, $LiAlCl_4$, LiFSI, chloroborane lithium, lower aliphatic carboxylic acid lithium and the like.

The electrolyte solvent is a non-aqueous organic solvent, and a single solvent may be used or a mixed organic solvent of two or more may also be used. When using a mixed organic solvent of two or more, selecting and using one or more solvents from two or more groups among a weak polar solvent group, a strong polar solvent group and a lithium metal protecting solvent group is preferred.

The weak polar solvent is defined as a solvent with a dielectric constant of smaller than 15 capable of dissolving sulfur elements among aryl compounds, bicyclic ether and non-cyclic carbonate, the strong polar solvent is defined as a solvent with a dielectric constant of larger than 15 capable of dissolving lithium polysulfide among non-cyclic carbonate, sulfoxide compounds, lactone compounds, ketone compounds, ester compounds, sulfate compounds and sulfite compounds, and the lithium metal protecting solvent is defined as a solvent having charge and discharge cycle efficiency of 50% or greater and forming a stable solid electrolyte interface (SEI) on lithium metal such as saturated ether compounds, unsaturated ether compounds, heterocyclic compounds including N, O, S or combinations thereof.

Specific examples of the weak polar solvent may include xylene, dimethoxyethane, 2-methyl tetrahydrofuran, diethyl carbonate, dimethyl carbonate, toluene, dimethyl ether, diethyl ether, diglyme, tetraglyme or the like.

Specific examples of the strong polar solvent may include hexamethyl phosphoric triamide, γ-butyrolactone, acetonitrile, ethylene carbonate, propylene carbonate, N-methyl pyrrolidone, 3-methyl-2-oxazolidone, dimethyl formamide, sulfolane, dimethyl acetamide, dimethyl sulfoxide, dimethyl sulfate, ethylene glycol diacetate, dimethyl sulfite, ethylene glycol sulfite or the like.

Specific examples of the lithium protecting solvent may include tetrahydrofuran, ethylene oxide, dioxolane, 3,5-dimethyl isoxazole, furan, 2-methylfuran, 1,4-oxane, 4-methyldioxolane or the like.

The electrolyte may be one or more types selected from the group consisting of a liquid electrolyte, a gel polymer electrolyte and a solid polymer electrolyte. The electrolyte may be preferably an electrolyte in a liquid state.

In addition, the present invention provides a battery module including the lithium-sulfur battery as a unit cell.

The battery module may be used as a power supply of medium to large-sized devices requiring high temperature stability, long cycle and high capacity properties.

Examples of the medium to large-sized device may include power tools operated through receiving electric power by a battery motor; electric vehicles including electric vehicles (EV), hybrid electric vehicles (HEV), plug-in hybrid electric vehicles (PHEV) and the like; electric two-wheeled vehicles including e-bikes, e-scooters and the like; electric golf carts; systems for power storage and the like, but are not limited thereto.

Mode for Invention

Hereinafter, preferred examples will be provided in order to illuminate the present invention, however, the following examples are for illustrative purposes only, and it will be obvious to those skilled in the art that various changes and modifications may be made within the scope and technological ideas of the present invention, and such changes and modifications also belong to the scope of the attached claims.

EXAMPLE AND COMPARATIVE EXAMPLE

Example 1

After introducing 1 g of carbon nanotubes to a solution including polyethylene oxide, the result was stirred for 12 hours at 80° C., then washed and dried to form a polyethylene oxide coating layer on a porous carbon material. Herein, a weight ratio of polyethylene oxide:carbon in the porous carbon material was 2:8. Herein, the carbon means a total weight of the carbon nanotubes.

1.25 g of the prepared polyethylene oxide-coated porous carbon material and 3 g of sulfur were evenly mixed, and then the result was heat treated for 30 minutes at 155° C. to prepare a sulfur-carbon composite including the sulfur:porous carbon material:polyethylene oxide in a weight ratio of 70.6:23.5:5.9.

After preparing slurry in a weight ratio of sulfur-carbon composite:conductor:binder=90:5:5 using the prepared sulfur-carbon composite, the slurry was coated on an aluminum foil current collector having a thickness of 20 μm to prepare an electrode. Herein, carbon black was used as the conductive material, styrene butadiene rubber and carboxymethyl-cellulose were used as the binder.

Example 2

An electrode was prepared in the same manner as in Example 1 except that expanded graphite was used instead of the carbon nanotubes.

Comparative Example 1

An electrode was prepared in the same manner as in Example 1 except that carbon nanotubes with no polyethylene oxide coating layer formation were used.

Comparative Example 2

The carbon nanotubes, sulfur and polyethylene glycol were mixed at the same time in a weight ratio of 25:75:6.25. An electrode was prepared in the same manner as in Example 1 using this mixture.

Experimental Example 1

Evaluation of Charge and Discharge Property

A lithium-sulfur battery coin cell was manufactured using each of the electrodes prepared in the examples and the comparative examples as a positive electrode, polyethylene as a separator, and lithium foil having a thickness of 150 μm as a negative electrode. Herein, the coil cell used an electrolyte prepared by dissolving 1 M LiFSI and 1% $LiNO_3$ in an organic solvent formed with diethylene glycol dimethyl ether and 1,3-dioxolane (DECDME:DOL=6:4 (volume ratio)).

For the manufactured coin cells, capacity was measured from 1.5 V up to 2.7 V using a charge and discharge measuring device. Specifically, charge and discharge efficiency was measured by repeating a cycle of charging with a 0.1 C rate CC/CV and discharging with a 0.1 C rate CC times (CC: Constant Current, CV: Constant Voltage). Herein, the obtained results are shown in the following Table 1 and FIG. 1.

TABLE 1

| | Initial Charge and Discharge Capacity (mAh/g) | Charge and Discharge Efficiency after 30 Times (%) |
|---|---|---|
| Example 1 | 1220 | 100.2 |
| Example 2 | 1100 | 99.7 |
| Comparative Example 1 | 1120 | 99.3 |
| Comparative Example 2 | 1150 | 99.5 |

Through Table 1, it was identified that the examples had more superior initial charge and discharge capacity and charge and discharge efficiency after 30 times compared to the comparative examples. Particularly, as shown in FIG. 1, it was identified that Comparative Example 1 with no coating layer formation had initial capacity of 1,120 mAh/g, whereas the coin cell using the sulfur-carbon composite of Example 1 as a positive electrode active material had initial capacity enhanced to 1,220 mAh/g, and had excellent charge and discharge efficiency after 30 times as well. In addition, it was identified that, compared to existing sulfur-carbon composites including expanded graphite without a separate ion conducting polymer coating layer having initial capacity of approximately 1,000 mAh/g, Example 2 had improved charge and discharge capacity and efficiency by being provided with an ion conducting polymer coating layer. As a result, it was identified that the sulfur-carbon composite according to the present invention is effective in enhancing initial charge and discharge capacity and efficiency.

INDUSTRIAL APPLICABILITY

The sulfur-carbon composite of the present invention including an ion conducting polymer coating layer on a porous carbon material surface, and thereby has an improved lithium ion conducting property to a positive electrode enabling a lithium-sulfur battery to have high capacity, high stability and long life time.

The invention claimed is:

1. A sulfur-carbon composite, prepared by a process comprising:
    providing a porous carbon material, wherein the porous carbon material comprises an inner and outer surface;
    applying a coating layer comprising an ion conducting polymer to the inner and outer surface of the porous carbon material; and
    providing sulfur on at least a part of an inside and outside surface of the porous carbon material;
    wherein the coating layer is formed between the porous carbon material and the sulfur;
    wherein the ion conducting polymer is included in an amount of from 0.1 parts by weight to 50 parts by weight, based on 100 parts by weight of the porous carbon material;
    wherein the porous carbon material has porosity of from 10% to 90% of a total volume of the porous carbon material; and
    wherein the sulfur comprises at least one selected from the group consisting of inorganic sulfur ($S_8$), $Li_2S_n$ (n≥1), organic sulfur compounds and carbon-sulfur polymers [$(C_2S_x)_n$, x=2.5 to 50, n≥2].

2. The sulfur-carbon composite of claim 1, wherein the ion conducting polymer comprises at least one selected from the group consisting of poly(ethylene oxide), poly(propylene oxide), poly(vinylidene fluoride), poly(vinylidene fluoride-co-hexafluoropropylene), poly(olefin), polyphosphazene, poly(acrylonitrile), poly(methylmethacrylate), poly(vinyl chloride) and polysiloxane.

3. The sulfur-carbon composite of claim 1, wherein the porous carbon material comprises at least one selected from the group consisting of graphite, graphene, carbon black, carbon nanotubes, carbon fibers and active carbon.

4. The sulfur-carbon composite of claim 1, wherein the porous carbon material has an average pore diameter of from 1 nm to 200 nm.

5. The sulfur-carbon composite of claim 1, wherein a weight ratio of (a) the porous carbon material and the coating layer comprising the ion conducting polymer and (b) the sulfur is from 1:9 to 5:5.

6. The sulfur-carbon composite of claim 1, the sulfur-carbon composite further comprises an additional conductive material.

7. A positive electrode for a lithium-sulfur battery comprising the sulfur-carbon composite of claim 1.

8. A lithium-sulfur battery comprising the positive electrode of claim 7.

* * * * *